(12) United States Patent
Vesuna et al.

(10) Patent No.: US 8,169,991 B2
(45) Date of Patent: May 1, 2012

(54) INTERFERENCE MITIGATION IN MOBILE UNITS HAVING LOCATION TRANSMITTERS

(75) Inventors: Sarosh Vesuna, Los Altos, CA (US); Chris Zegelin, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 2010 days.

(21) Appl. No.: 10/837,439

(22) Filed: Apr. 30, 2004

(65) Prior Publication Data
US 2005/0243781 A1    Nov. 3, 2005

(51) Int. Cl.
*H04Q 7/28* (2006.01)
(52) U.S. Cl. ............... 370/341; 370/343; 370/348
(58) Field of Classification Search .......... 455/456, 455/574; 370/238, 238.1, 338, 339, 341–343, 370/344–349, 468, 229, 230, 252, 310, 254, 370/445, 447, 235, 294
See application file for complete search history.

(56) References Cited

U.S. PATENT DOCUMENTS

| | | | |
|---|---|---|---|
| 5,677,909 A * | 10/1997 | Heide ........................... | 370/347 |
| 6,295,455 B1 | 9/2001 | Fischer et al. | |
| 6,892,054 B2 * | 5/2005 | Belcher et al. ............... | 455/63.1 |
| 7,881,340 B2 * | 2/2011 | Farrag et al. .................. | 370/468 |
| 2003/0050078 A1 * | 3/2003 | Motegi et al. ................ | 455/456 |
| 2004/0078151 A1 | 4/2004 | Aljadeff et al. | |
| 2004/0242159 A1 * | 12/2004 | Calderon et al. ............. | 455/63.3 |
| 2005/0010663 A1 * | 1/2005 | Tatman et al. ................ | 709/224 |
| 2005/0030160 A1 * | 2/2005 | Goren et al. .................. | 340/10.5 |
| 2005/0128988 A1 * | 6/2005 | Simpson et al. .............. | 370/338 |
| 2005/0201341 A1 * | 9/2005 | Griswold ....................... | 370/338 |
| 2005/0221869 A1 * | 10/2005 | Liu et al. ....................... | 455/574 |

OTHER PUBLICATIONS

International Search Report PCT/US05/14805.
English Language Translation of Notice of Allowance mailed on May 8, 2009 for counterpart Chinese Patent Application No. 200580013860.8.
English Language Translation of Office Action mailed on May 31, 2010 for counterpart Japanese Patent Application No. 2007-511014.
International Preliminary Report on Patentability for counterpart International Application No. PCT/US2005/014805 issued on Nov. 1, 2006.

* cited by examiner

*Primary Examiner* — Chuong T Ho (57) ABSTRACT

A mobile device for data communications has a radio circuit for data communications with a wireless network access point and a radio tag for transmitting location-identifying radio signals. The radio circuit and the radio tag are co-located on a circuit board or are commonly powered. The operation of the radio circuit and the radio tag are segregated in time to avoid interference. Standard wireless network interface protocol functions are exploited to identify time intervals in which the radio circuit is inactive for data communications. These time intervals are used to operate the radio tag to transmit the location-identifying radio signals.

6 Claims, 5 Drawing Sheets

INTERFERENCE MITIGATION IN MOBILE UNITS HAVING LOCATION TRANSMITTERS

BACKGROUND OF THE INVENTION

The present invention relates to wireless data communications systems, particularly systems using standardized protocols, and also to wireless systems for locating items.

Wireless communication has been available in varying forms since early in the 20th Century. However, the ability to readily connect through a wireless medium by radio on an anytime-anywhere basis, particularly for data communication purposes, is more recent. The recent ability to connect on anytime-anywhere basis has been facilitated by developments of cellular and Personal Communications Services (PCS) networks into second and third generation digital; the entry of new competitive wireless service providers; vast improvements in digital signal processing; and new commonly-adopted industry Standards such as IEEE Standard 802.11, IEEE Standard 802.16, IEEE Standard 802.20, Wireless Application Protocol (WAP), or the Bluetooth protocol. These developments have resulted in dramatic growth in the infrastructure and capabilities of wireless data communication networks (e.g., wireless local area networks (WLAN), communication products (e.g. cell phones, personal digital assistants (PDA), etc.) and user interest.

Co-pending and co-assigned application Ser. No. 09/528, 697, filed Mar. 17, 2000, which is incorporated by reference herein, describes a wireless system which follows the protocol of IEEE Standard 802.11, but which uses a combination of RF Ports and Cell Controllers to perform the functions of Access Points of a classical IEEE 802.11, IEEE Standard 802.16, or IEEE Standard 802.20, data communications system. Lower level protocol functions of the medium access control (MAC) functions are performed by the RF Ports and higher-level protocol functions, including association and roaming functions, are performed by the cell controller. The term "access point" as used herein is intended to include conventional access points, such as those which follow the protocol of IEEE Standard 802.11 and perform all MAC functions, as well as RF Ports operating with cell controllers, as described in the incorporated co-pending application.

The IEEE Standard 802.11 for WLANs specifies a common interface (i.e., the "802.11 MAC Layer") between devices (e.g., network access points and radios or radio network interface cards), which provides a variety of functions to support the operation a conforming WLAN for data communications. The 802.11 MAC Layer manages and maintains communications between devices by coordinating access to a shared radio channel and utilizing protocols that enhance communications over the wireless medium. The 802.11 MAC Layer uses an 802.11 Physical (PHY) Layer (e.g., as defined by standards such as 802.11b or 802.11a) to perform the tasks of carrier sensing, transmission, and receiving of 802.11 wireless data or message frames. See e.g., http://standards .ieee.org/getieee802/802.11.html.

The primary functions of the 802.11 MAC layer include functions such as "Scanning", "Probing", "Request-to send/ Clear-to send" (RTS/CTS), and "Power Save/Poll Mode" (PSM). The Scanning function is used when a radio device's network interface card (radio NIC) searches for suitable access points in the WLAN. Each access point periodically broadcasts a radio beacon that contains information about the access point, including service set identifier (SSID), supported data rates, etc. The radio NIC receives the access points' beacons while scanning. The radio NIC may use the information coded in the received beacons along with the beacon signal strengths to compare access points and decide upon which access point to associate with for sending or receiving WLAN data frames.

The RTS/CTS function allows an access point to control use of the wireless medium by a radio NIC that has activated the RTS/CTS function. The radio NIC activates the RTS/CTS function by sending a RTS frame to access point before sending a data frame. The access point may respond with a CTS frame, indicating that the radio NIC can send the data frame. In the CTS frame, the access point provides a value in a duration field of the frame header for which it will hold off other stations from transmitting while the radio NIC initiating the RTS/CTS function sends its data frame.

The PSM function allows a user to turn off a radio NIC to conserve battery power when there is no need to send data. With PSM activated, the radio NIC indicates its desire to enter "sleep" state to the access point via a status bit located in the header of a transmitted data frame. The access point takes note of each radio NIC wishing to enter a sleep state, and buffers data packets intended for the sleeping radio NICs.

In order to still receive data frames, each sleeping NIC must wake up periodically (at the right time) to receive regular beacon transmissions coming from the access point. These beacons identify whether sleeping stations have frames buffered at the access point awaiting delivery to their respective destinations. A radio NIC having awaiting buffered frames will request them from the access point. After receiving the frames, the radio NIC can go back to sleep.

In addition to providing data communications, a WLAN also can be used to physically locate the radio NIC. The use of data communications systems to perform location functions for locating mobile units is described in articles entitled Enhancements to the User Location and Tracking System, by Paramvir Bahl and Venkata N. Padmanabhan, and User Location and Tracking in an In-Building Radio Network, Microsoft Technical Report MSR-TR-99-12, dated February 1999, by the same authors, both published by Microsoft Research. As described therein signal strength of signals of the wireless data communications system, such as a system using the protocol of IEEE Standard 802.11, are used for locating mobile units within an area serviced by the system. Other techniques for locating mobile units using the wireless data communications systems or other location system are possible.

For some applications, a Real Time Location System (RTLS), which functions independently from a WLAN, may be provided for mobile units (e.g., radios or radio NICs) that are used for data communications over the WLAN. For such applications, the mobile units are provided with radio transmitters or tags, which periodically transmit identifying radio signals that are used for real time location determination. However, in these applications, the identifying radio transmissions from the mobile units can interfere with the operation of the WLAN, in that the radio signals intended for the RTLS may overwhelm the WLAN receivers, or in that that mobile units may use common power amplifiers and/or antennas for the RTLS and WLAN transmitters.

It is an object of the invention to provide arrangements and methods for mitigating interference in a mobile unit between operation of a location system transmitter and a local area network radio.

SUMMARY OF THE INVENTION

In accordance with the principles of the invention, methods and arrangements for the integrated functioning of a WLAN data communications system and an RLTS are provided.

A mobile device, which may be used, for wireless data communications has an RF radio for connection to the WLAN system. The mobile device is also provided with a radio tag for transmitting bursts of identifying radio signals that are processed by the RTLS to determine the location of the mobile unit. The RF radio and the radio tag may be co-located on a common circuit board or may otherwise share common power supplies or other circuit components.

The mobile device is operated with the WLAN data communications system and an RLTS in a manner that mitigates any mutual interference between the functioning of the two systems. First, time intervals in which the RF radio is inactive are identified. The radio tag is operated to transmit the bursts of identifying radio signals only during the identified time intervals in which the RF radio is inactive. Alternatively, airtime on the WLAN network is reserved exclusively for transmitting the bursts of identifying radio signals. The time-segregated operation of the RF radio and the radio tag is likely to minimize any interference between the data communication functions of the WLAN system and the locating function of the RTLS.

In an embodiment of the invention, features or functions of a standard protocol interface between the RF radio and access points in the WLAN system may be used to identify the time intervals during which the RF radio is inactive or to reserve the airtime for the exclusive operation of the radio tag. In an exemplary system, the standard protocol interface may be an IEEE 802.11 or any other standard medium access control layer. A user-activated power save mode function of the protocol interface layer may be used to identify the time intervals during which the RF radio is inactive. Similarly a request-to-send/clear-to-send function of the standard protocol interface may be used to reserve airtime for the exclusive operation of the radio tag.

In an exemplary arrangement for providing wireless data communications and location services, a mobile device includes a first radio circuit for bi-directional wireless communication with an associated access point in a network of wireless access points and a second radio circuit for transmitting identification signals for the purpose of revealing its (the mobile device's) location. The arrangement includes a provision for identifying a time interval during which the first radio circuit is inactive in wireless communication with the associated access point, and a second provision for operating the second radio circuit to transmit the identification signals during the time interval that is identified by the first provision. In the arrangement, the wireless network access points and the mobile device may interface through a standard protocol layer such as the IEEE 802.11 or any other suitable standard protocol layer. The first provision uses functions or features of the standard protocol layer (e.g., PSM or RTS/CTS functions) to identify the time interval during which the first radio circuit is inactive in wireless communication with the associated access point.

BRIEF DESCRIPTION OF THE DRAWINGS

Further features of the invention, its nature, and various advantages will be more apparent from the following detailed description and the accompanying drawings, wherein like reference characters represent like elements throughout, and in which.

Throughout the figures, unless otherwise stated, the same reference numerals and characters are used to denote like features, elements, components, or portions of the illustrated embodiments.

DETAILED DESCRIPTION OF THE INVENTION

The present invention provides solutions for integrating the application of WLAN technologies for wireless data communication and the application of Real Time Location System (RLTS) technologies that are used to track the position of the mobile communication units.

The mobile communication units may be single integrated standalone communication units, traditional laptop computers, personal digital assistants (PDA), handheld computers, cellular phones, or any similar devices that include radios or radio NICs that are configured for data communication over a wireless network. The mobile units are also configured to include radio transmitters or tags that may be used to signal their location or any other identification information.

Figure 2A:
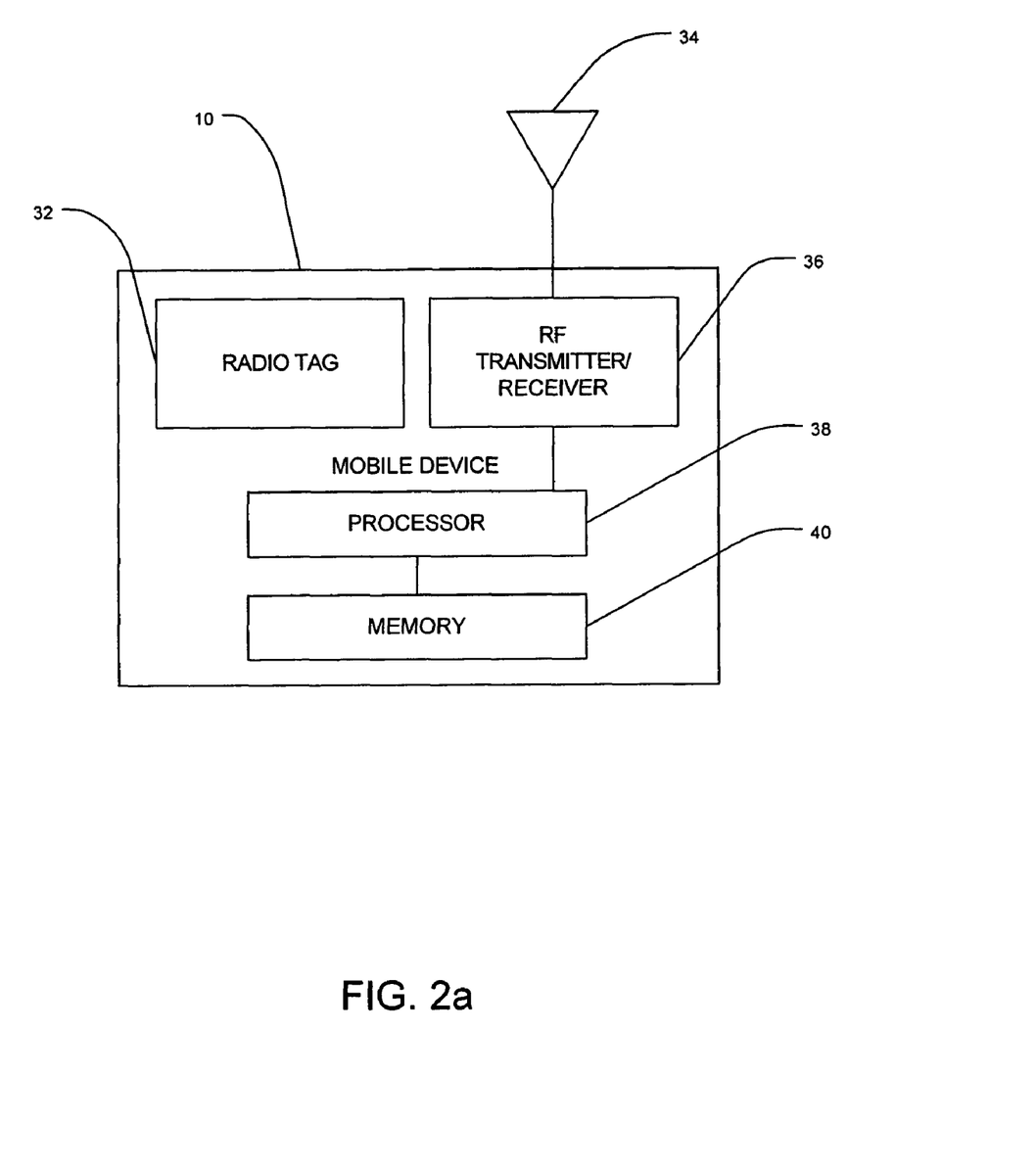
FIGS. 2a and 2b are schematic representations of a mobile device that may be used with the integrated WLAN and RTLS of FIG. 1, in accordance with the present invention.
Figure 2B:
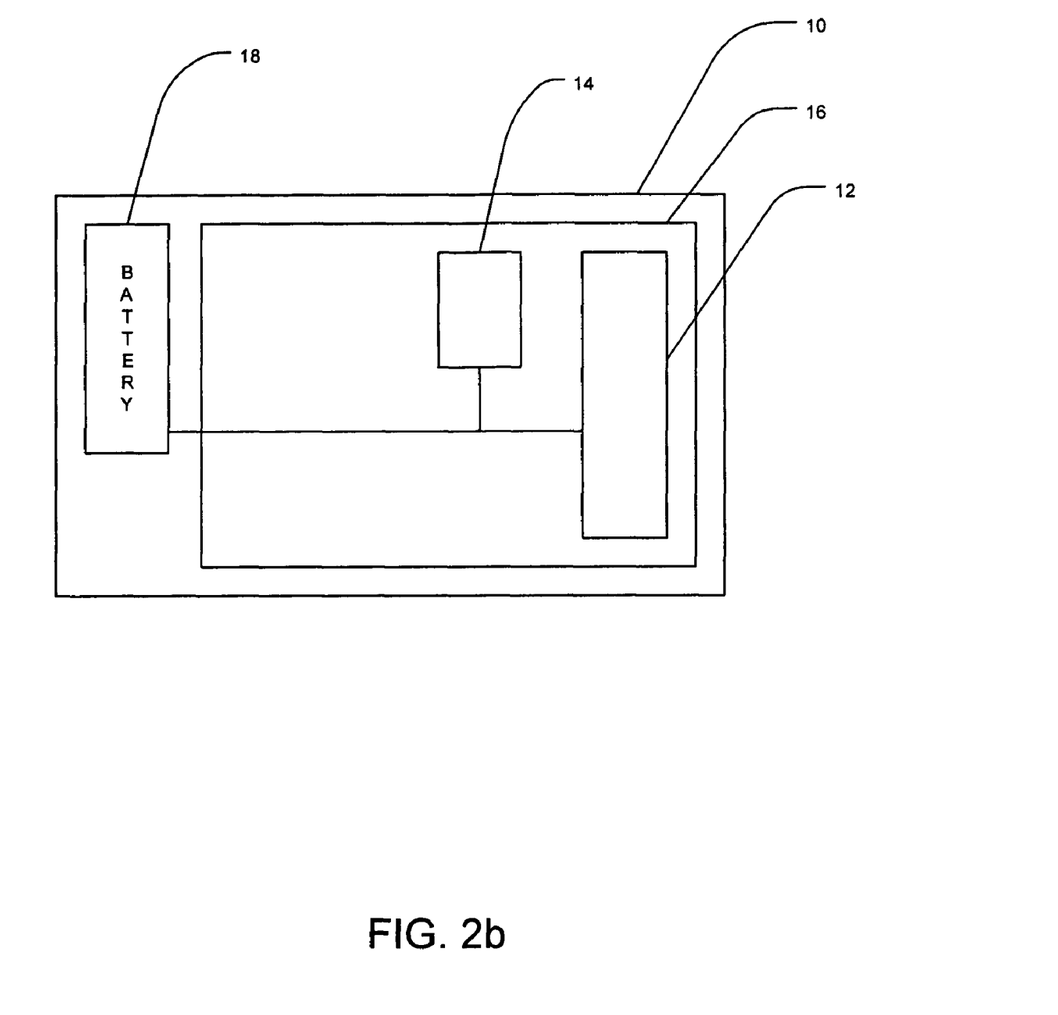

FIG. 2a shows an exemplary mobile device 10 that may be used in conjunction with the present invention. Mobile device 10 includes a radio transmitter or tag 32 by which it periodically emits identifying radio signals that may be used to identify the physical location of mobile device 10. Mobile device 10 also may include a processor 38, which may be a microcontroller, microprocessor, digital signal processor, application-specific integrated circuit (ASIC) or any other control circuit, which may be known to one of ordinary skill in the art. Processor 38 may communicate with a memory 40, which may be random access memory (RAM), read-only memory (ROM), or any other type of memory known to one of ordinary skill in the art. Processor 38 is coupled to a RF radio 36, which is equipped with an antenna 34 for sending and/or receiving data over a wireless network. RF radio 36 may be configured to communicate with a particular type of wireless network (e.g., a IEEE 802.11 Bluetooth network, or any other standard Wireless Network). Depending upon the particular type of the wireless network, RF radio 36 may be a GPRS radio, 802.11b radio, Bluetooth radio, or any other device capable of transmitting and receiving data over the particular type of the wireless network. FIG. 2b shows another schematic representation of mobile device 10 in which RF radio 36 is represented by a radio NIC 12.

Figure 1:
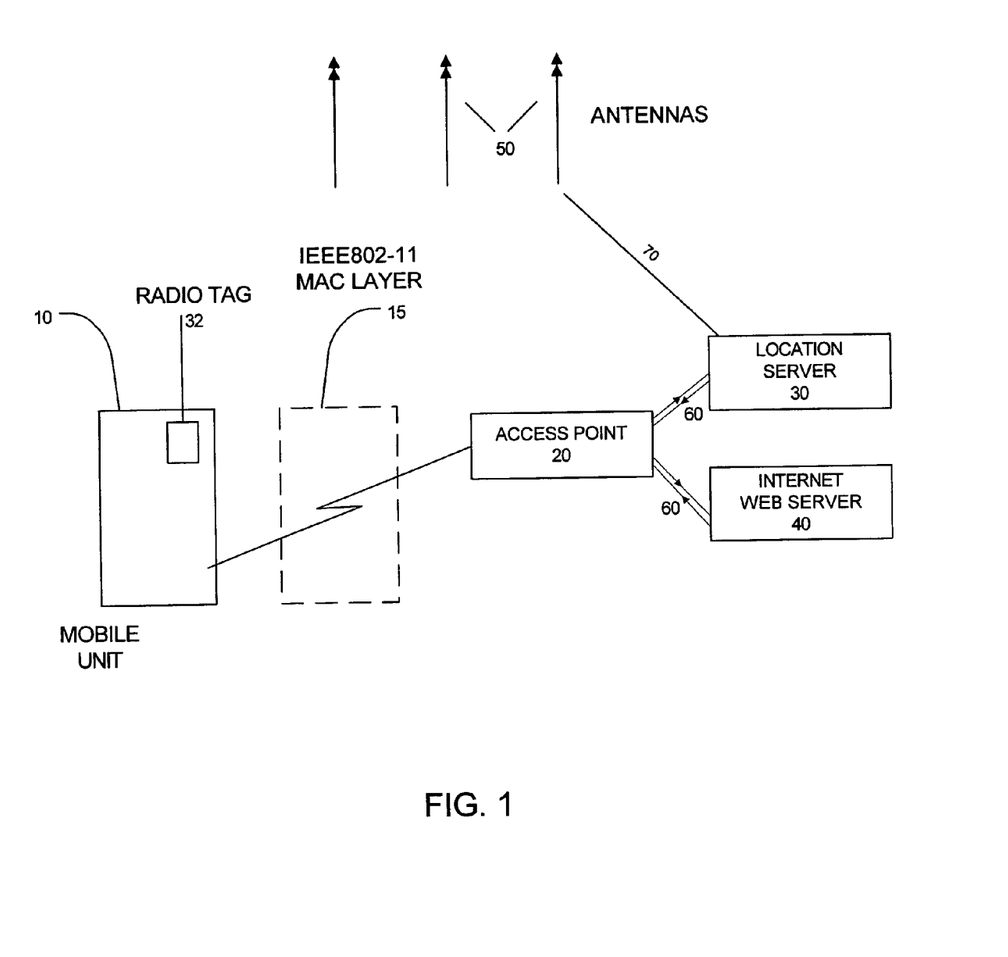
FIG. 1 is a schematic representation of an exemplary configuration of an integrated WLAN system and RTLS that may be jointly operated for wireless data communications with, and location identification of a mobile device, in accordance with the present invention.

Mobile device 10 may be used in conjunction with a data communications wireless network and/or a RLTS. FIG. 1 shows portions of an exemplary configuration of an integrated WLAN and RTLS system 100 in which a mobile unit (e.g., mobile device 10) communicates with an Internet web server 40 through an associated wireless access point 20 in accordance with the present invention. Mobile device 10 is in two-way radio communication with access point 20 through radio NIC 12. Access point 20 may include conventional radio transmitter/receiver structures (not shown) that are adapted or designed for wireless communications with radio NIC 12/RF radio 36 in mobile device 10. Access point 20 and radio NIC 12 may be mutually configured to operate according to a standard wireless communication protocol (e.g., IEEE Standard 802.11). The protocol interface layer between access point 20 and radio NIC 12 is represented figuratively in FIG. 1 by box 15 (e.g., IEEE 802.11 MAC layer 15). Further, access point 20 may be linked to Internet web server 40 by wire links 60 or any other conventional links.

For clarity, only one access point 20 and one mobile device 10 are shown in FIG. 1. It will be understood, however, that there may be many access points in, as well as many other mobile devices operating with system 100. Each access point may broadcast radio beacons indicating, for example, the extent or type of coverage provided by the access point. Each mobile device operating with system 100 may gauge the relative strength of the radio beacons signals along with other capability & loading information received from the various access points in system 100, and accordingly may preferentially associate with a particular access point (e.g., mobile device 10 with access point 20) for sending and receiving data frames for wireless data communications. System 100 also may include additional or alternate devices or computers (e.g., cell controllers that are described in the referenced co-pending application) for managing or coordinating the association and the flow of data between mobile devices with individual access points.

System 100 also includes an arrangement for locating mobile device 10. The arrangement may, for example, be similar to any conventional RTLS arrangement. System 100 may utilize short bursts of radio signals (RTLS signals) that are emitted at regular intervals by radio transmitter or tag 32 to determine the location of mobile device 10. For this purpose, system 100 includes a grid of readers, receivers or antennas 50 that are deployed at strategic geographical positions to pick up the RLTS signals transmitted by radio transmitter or tag 32 in mobile device 10. In one version of system 100, radio receivers in access points 20 that are conventionally used for WLAN data communications with mobile device 10 also may serve as antennas 50. System 100 may include a computer (e.g., location server 30) linked to antennas 50 by link 70. Location server 30 may be used to determine the location of mobile device 10 by analysis of the RLTS signals received at various antennas 50.

In accordance with the present invention, radio transmitter or tag 32 and radio NIC 12 may be advantageously integrated in a common circuit 16 in mobile device 10 (FIG. 2*b*). Radio transmitter or tag 32 and radio NIC 12 may, for example, be co-located on a common circuit board 16. In such a circuit board arrangement or other similar arrangements, radio transmitter or tag 32 and radio NIC 12 also may be advantageously powered by a common power supply 18. Further in accordance with the present invention, the operations of co-located or commonly powered radio NIC 12 and tag 32 for WLAN data communications and the RLTS function of system 100, respectively, are conducted in a manner that minimizes any mutual interference. The operational procedures for minimizing any mutual interference may exploit features or functions of the standard protocol utilized for WLAN data communications over system 100.

Figure 3:
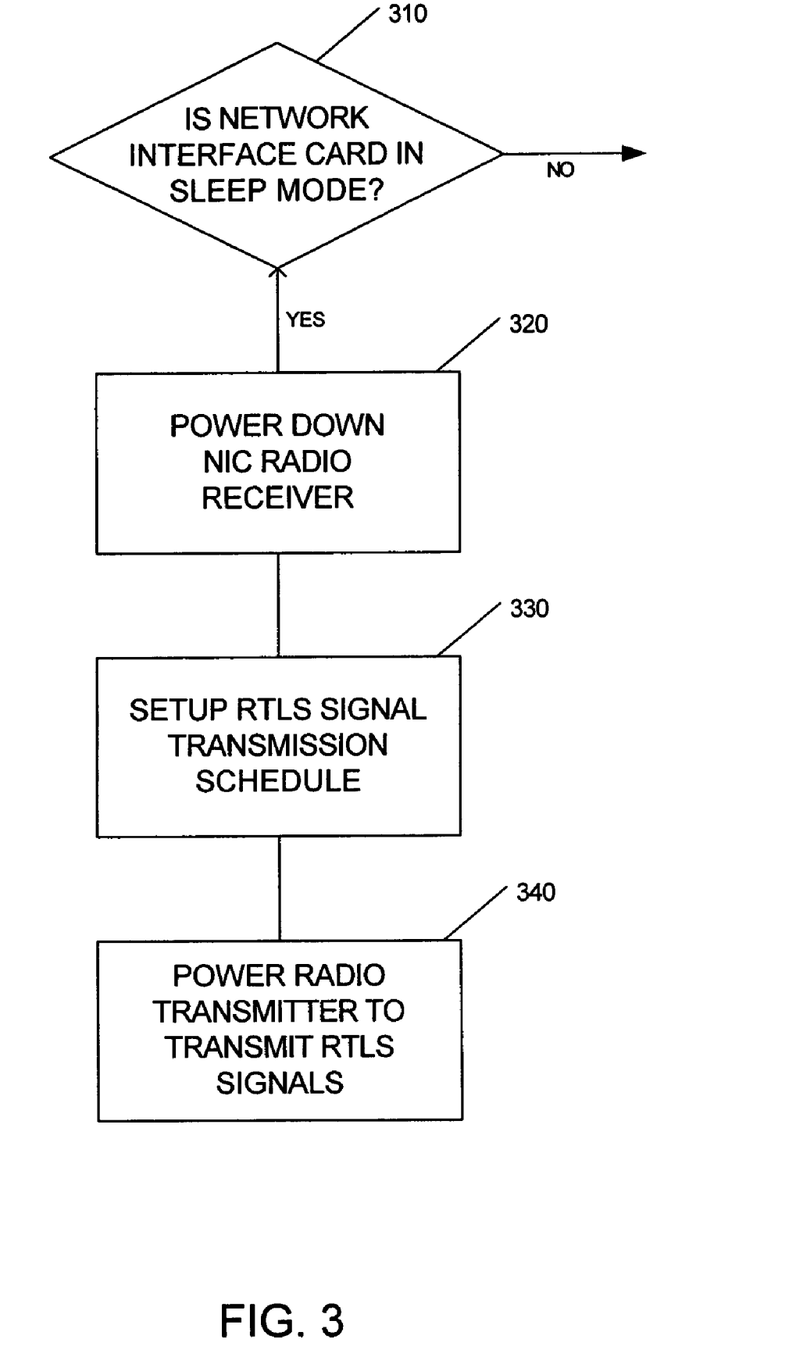
FIGS. 3 and 4 are flow charts of exemplary operating procedures for the integrated WLAN and RTLS of FIG. 1, in accordance with the present invention.
Figure 4:
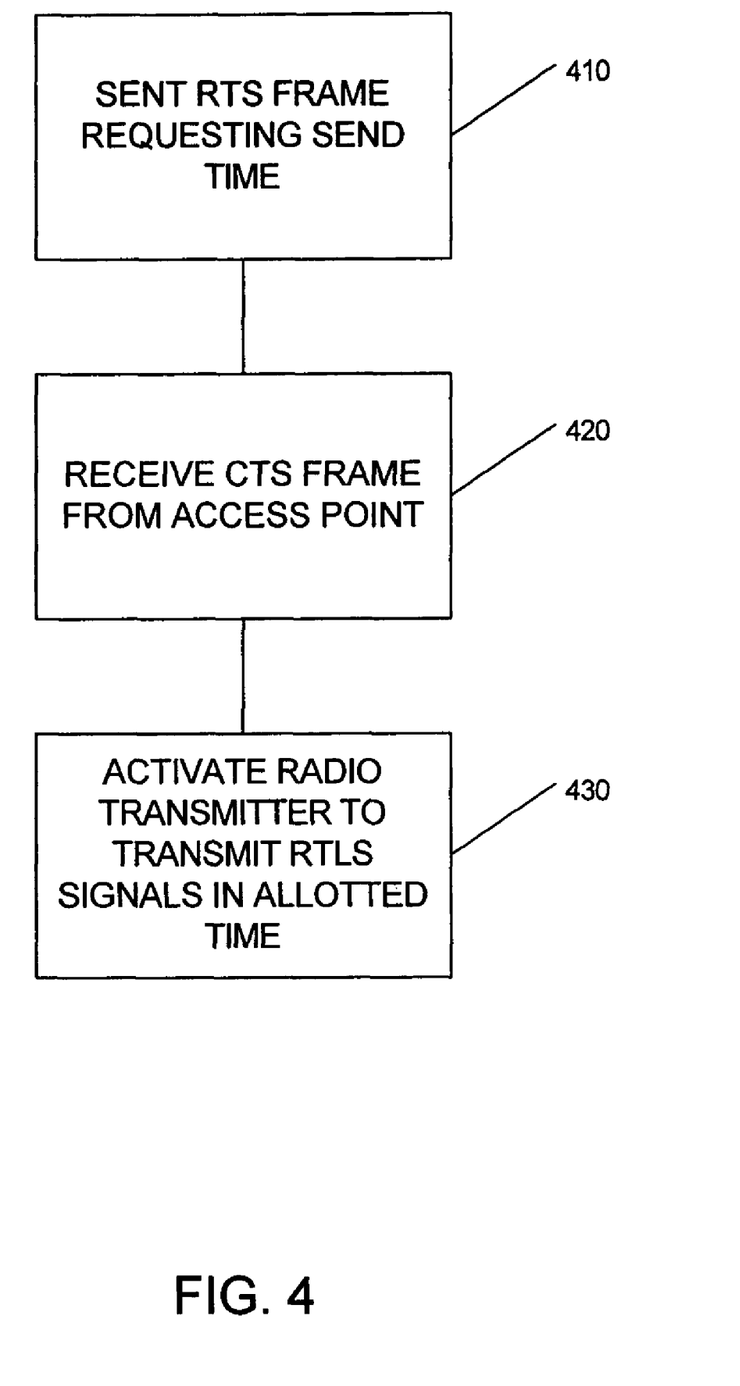

FIGS. 3 and 4 show flow charts of exemplary operating procedures 300 and 400 that are based, for example, on features or functions of a conventional IEEE 802.11 standard MAC layer (e.g., 802.11 MAC layer 15) supporting the operation of system 100 for WLAN data communications. In both operating procedures 300 and 400, radio transmitter or tag 32 is activated to transmit RTLS radio signals only during the time periods in which radio NIC 12 is not actively receiving or sending WLAN data frames.

With reference to FIG. 3, in procedure 300 at step 310 a determination is made of when radio NIC 12 is in a PSM or "sleep" mode (which a user of mobile device 10 may have initiated when there is no need to send data). When radio NIC 12 is in the PSM or "sleep" mode there is no expectation of any WLAN data frame transmission by radio NIC 12. Accordingly at step 320, radio NIC 12/RF radio 36 may be shut or powered down to conserve power. However, even during the PSM mode, radio NIC 12 may be revived on a regular polling schedule to receive polling beacon transmissions from access point 20. These beacons may identify whether asleep radio NIC 12 has data frames buffered at the access point 20 awaiting delivery. Radio NIC 12 having awaiting data frames may optionally request them from access point 20. After receiving the frames, radio NIC 12 may go back to sleep.

At step 330, a schedule is established so that the RTLS signal transmissions from mobile device 10 occur only within the time periods between the polling radio beacons emitted by access point 20 during which the NIC card 12 is asleep. At step 340, radio transmitter or tag 32 may be powered in consideration of the schedule established at step 330 to transmit bursts of radio signals for RTLS functionality of system 100.

It will be understood that the steps of operating procedure 300 have been described in a particular sequence only for convenience in description. In practice the steps may be performed in any suitable sequence or concurrently, for example, steps 310 and 330 may be suitably performed concurrently.

With reference to FIG. 4, procedure 400 for integrated operation of system 100 exploits the RTS/CTS function of the IEEE 802.11 MAC layer 15 in system 100. The RTS/CTS function is exploited to reserve exclusive medium time (i.e., wireless network airtime) for the RTLS signals. At step 410, radio NIC 12 is configured to reserve airtime for RTLS signal transmission by sending a RTS frame (or alternatively a null data frame) to access point 20. Both the RTS frame and the alternative null data frame have a duration field. The duration field in which ever one of the frames is sent may be set to a suitable time interval, which is sufficiently large to encompass the duration of the RTLS signal bursts and any other signaling required of the completion of the RTLS transaction, required for the RTLS function of system 100. At step 420, a CTS frame may be received from access point 20. The CTS frame header may have a value in its duration field indicating the allotted time interval for which access point 20 will hold off wireless data communications with other mobile devices operating with system 100. In response to the CTS frame, in conventional WLAN data communication procedures, radio NIC 12 sends its WLAN data frames to access point 20. Here in procedure 400, in response to the CTS frame, transmitter or tag 32 is instead at step 430 activated to transmit RTLS signal bursts within the allotted time interval. Steps 410-430 may be repeated at predetermined intervals as desired or appropriate for the RTLS function of system 100.

It will be understood that the features of a protocol interface layer that may be exploited for integrating the operations of radio transmitter or tag 32 and radio NIC 12 in a common circuit 16 are not limited to the particular features (e.g., PSM and RTS/CTS of IEEE 802.11 MAC layer 15) described with reference to procedures 300 and 400. Other features or aspects of a protocol interface layer may be used to devise alternate procedures for the integrated operation of radio transmitter or tag 32 for the RLTS function of system 100 and the operation of network interface card 12 for WLAN data communications in a common circuit 16. For example, access point 20 may be configured to send a "busy" message signal to network interface card 12 when (system 100) is engaged in WLAN data communications with a mobile unit other than mobile device 10. The busy message may be generated in response to a RTS frame from mobile device 10/radio NIC 12 requesting WLAN data transmission time. The busy message may, for example, be represented by a negative value in the duration field of a CTS frame. The radio NIC 12/common circuit 16 of mobile device 10 may be configured to respond to the busy message by exploiting the unavailability of system 100 for wireless data communications to promptly schedule a RTLS signal transmission instead. In this manner, RTLS signal transmissions and WLAN data communications from mobile device 10 are segregated in time so as not to interfere with each other.

It will be understood that the foregoing is only illustrative of the principles of the invention, and that various modifications can be made by those skilled in the art without departing from the scope and spirit of the invention. For example, the invention may be readily used in wireless data communication systems using any of the variety of available or evolving wireless data communication protocols.

We claim:

1. A method for wireless data communications between a network of wireless access points and a mobile device, wherein the mobile device comprises a first radio circuit for bidirectional wireless communication with an associated access point and a second radio circuit for transmitting identification signals for the purpose of revealing at least one of mobile unit's identification and location, the method comprising the steps of:
   identifying a time interval during which the first radio circuit is inactive in wireless communication with the associated access point by:
      sending a request-to-send frame from the mobile device to the associated access point;
      receiving a clear-to-send duration value from the associated access point; and
      reserving a time interval within the duration value exclusively for transmitting identification signals from the mobile device;
   activating a power save mode in the mobile device to indicate that no data transmissions are intended by the first radio circuit during the time interval, wherein the power save mode shuts down power to the first radio circuit;
   buffering data intended for the mobile unit in the associated access point while power to the first radio circuit is shut down;
   operating the second radio circuit to transmit the location and identification signals during the time interval of the identifying step while power to the first radio circuit is shut down; and
   periodically re-activating the first radio circuit to receive beacon transmissions from the access point according to a regular polling schedule and scheduling operation of the second radio circuit according to the polling schedule.

2. The method of claim 1 wherein the wireless network access points and the mobile device interface through a protocol layer having functions for managing flow of wireless communications between the wireless network access points and the mobile device, and wherein the identifying step further comprises using a function of protocol layer to identify a time interval during which the first circuit is inactive in wireless communication with the associated access point.

3. The method of claim 2 wherein the protocol layer is a medium access control layer selected from the group of IEEE 802.11, IEEE 802.16, IEEE 802.20, and industry Standard wireless medium access control layers.

4. An arrangement for data communications between a network of wireless access points and a mobile device, wherein the mobile device comprises a first radio circuit for bidirectional wireless communication with an associated access point and a second radio circuit for transmitting identification signals for the purpose of revealing the mobile device's location, wherein the arrangement comprises:
   a provision for identifying a time interval during which the first radio circuit is inactive in wireless communication with the associated access point by:
      sending a request-to-send frame from the mobile device to the associated access point;
      receiving a clear-to-send duration value from the associated access point; and
      reserving a time interval within the duration value exclusively for transmitting identification signals from the mobile device;
   a provision for activating a power save mode in the mobile device to indicate that no data transmissions are intended by the first radio circuit during the time interval, wherein the power save mode shuts down power to the first radio circuit;
   a provision for buffering data intended for the mobile unit in the associated access point while power to the first radio circuit is shut down;
   a provision for operating the second radio circuit to transmit the location and identification signals during the time interval from the provision for identifying while power to the first radio circuit is shut down; and
   a provision for periodically re-activating the first radio circuit to receive beacon transmissions from the access point according to a regular polling schedule and scheduling operation of the second radio circuit according to the polling schedule.

5. The arrangement of claim 4 wherein the wireless network access points and the mobile device interface through a protocol layer having functions for managing flow of wireless communications between the wireless network access points and the mobile device, and wherein the provision for identifying comprises use of a function of protocol layer to identify the time interval during which the first radio circuit is inactive in wireless communication with the associated access point.

6. The arrangement of claim 5 wherein the protocol layer is a medium access control layer selected from the group of IEEE 802.11, IEEE 802.16, IEEE 802.20, and industry Standard wireless medium access control layers.

* * * * *

UNITED STATES PATENT AND TRADEMARK OFFICE
CERTIFICATE OF CORRECTION

PATENT NO. : 8,169,991 B2  
APPLICATION NO. : 10/837439  
DATED : May 1, 2012  
INVENTOR(S) : Vesuna et al.

It is certified that error appears in the above-identified patent and that said Letters Patent is hereby corrected as shown below:

In Column 1, Line 24, delete "(WLAN)," and insert -- (WLAN)), --, therefor.

In Column 2, Line 67, delete "RLTS" and insert -- RTLS --, at each occurrence throughout the specification.

Signed and Sealed this  
First Day of January, 2013

David J. Kappos  
*Director of the United States Patent and Trademark Office*